United States Patent
Kim (10) Patent No.: US 8,306,662 B2
(45) Date of Patent: Nov. 6, 2012

(54) POSITION DETECTION DEVICE FOR MOBILE ROBOT AND ROBOT CLEANER INCLUDING THE SAME

(75) Inventor: Sang Yun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 861 days.

(21) Appl. No.: 12/349,873

(22) Filed: Jan. 7, 2009

(65) Prior Publication Data
US 2009/0218478 A1  Sep. 3, 2009

Related U.S. Application Data

(63) Continuation-in-part of application No. 11/320,771, filed on Dec. 30, 2005, now abandoned.

(30) Foreign Application Priority Data

Apr. 23, 2005  (KR) .................. 10-2005-0033842

(51) Int. Cl.
*G05D 1/02* (2006.01)
(52) U.S. Cl. ........................................ 700/259; 356/28
(58) Field of Classification Search .................. 700/245, 700/250, 255, 258, 259; 356/28; 318/567, 318/568.12, 568.16, 577
See application file for complete search history.

(56) References Cited

U.S. PATENT DOCUMENTS

| | | | |
|---|---|---|---|
| 2,424,460 A | 7/1947 | Hettelsater | |
| 4,721,384 A | 1/1988 | Dietrich et al. | |
| 5,400,244 A * | 3/1995 | Watanabe et al. | 701/28 |
| 5,652,489 A | 7/1997 | Kawakami et al. | |
| 5,699,151 A | 12/1997 | Akasu et al. | |
| 5,757,792 A | 5/1998 | Aoki et al. | |
| 5,819,008 A * | 10/1998 | Asama et al. | 700/255 |
| 7,720,554 B2 * | 5/2010 | DiBernardo et al. | 700/56 |
| 2001/0055063 A1 | 12/2001 | Nagai et al. | |
| 2002/0075180 A1 | 6/2002 | Sakai et al. | |
| 2004/0088079 A1 | 5/2004 | Lavarec et al. | |
| 2005/0166355 A1 | 8/2005 | Tani | |
| 2005/0213082 A1 | 9/2005 | DiBernardo et al. | |

FOREIGN PATENT DOCUMENTS

| | | |
|---|---|---|
| JP | 2004-001740 A | 1/2004 |
| JP | 2004-267236 A | 9/2004 |

\* cited by examiner

*Primary Examiner* — Dalena Tran
(74) *Attorney, Agent, or Firm* — Birch, Stewart, Kolasch & Birch, LLP (57) ABSTRACT

The present invention relates to a position detection device for a mobile robot, including a light-emitting element for emitting light, a light reception element on which light transferred from a bottom, of the light emitted from the light-emitting element and then reflected from an obstacle, is focused, and a signal processing unit for calculating a distance between a position where the light incident on the light reception element is focused and the obstacle. A position detection method using a mobile robot may include operating a robot cleaner, receiving light transferred from a bottom, of light emitted from the robot cleaner and then reflected from an obstacle, and detecting a distance between the robot cleaner and the obstacle from which the light is reflected, determining whether the distance between the robot cleaner and the obstacle increases, and determining whether the robot cleaner has approached the obstacle.

15 Claims, 5 Drawing Sheets

POSITION DETECTION DEVICE FOR MOBILE ROBOT AND ROBOT CLEANER INCLUDING THE SAME

This application is a Continuation-In-Part of co-pending application Ser. No. 11/320,711 filed on Dec. 30, 2005, which claims the benefit of Korean Application No. 2005-33842 filed on Apr. 23, 2005, each of which is hereby incorporated by reference as if fully set forth herein.

FIELD OF THE INVENTION

The present invention relates to a position detection device for a mobile robot, and, more particularly, to a position detection device for a mobile robot and a robot cleaner including the same, which is capable of detecting the distance between the position detection device and an obstacle, while the robot cleaner moves, without erroneously recognizing external rays of light as obstacles.

DESCRIPTION OF THE RELATED ART

Generally, a position detection device for a mobile robot is used to emit infrared light and detect the distance from an obstacle from which the infrared light is reflected.

Figure 1:
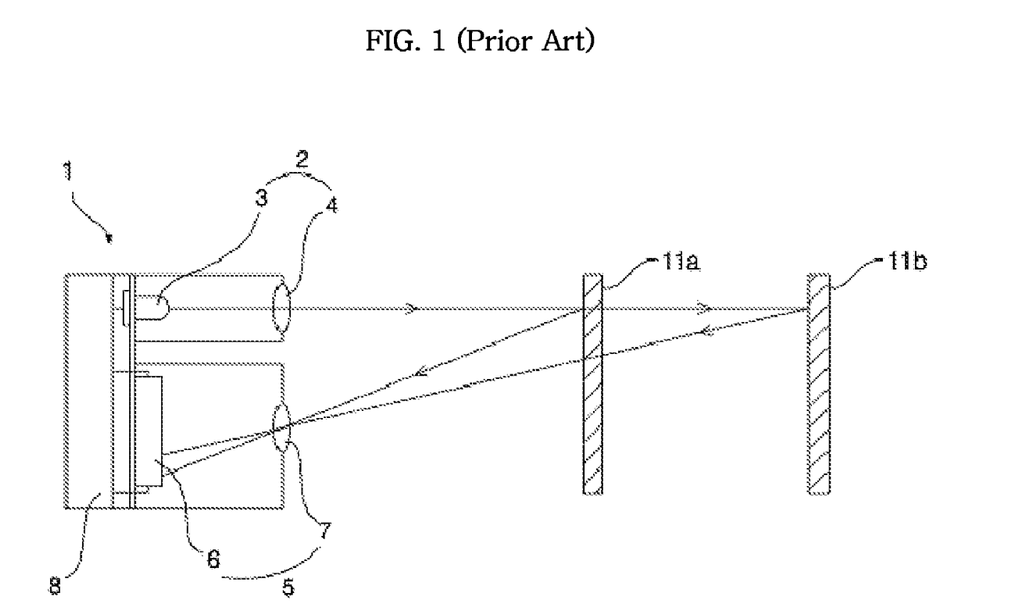
FIG. 1 is a diagram showing the construction and operational principle of the position detection device.
Figure 2:
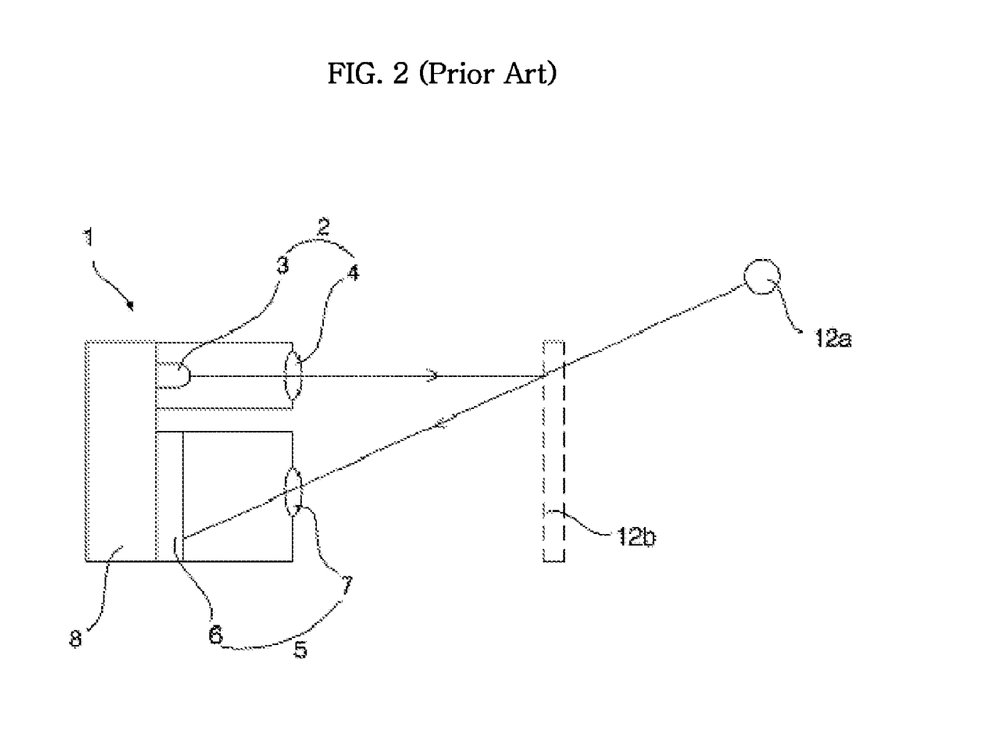
FIG. 2 is a diagram showing the position detection device when interfering rays of light are applied to the position detection device.

FIGS. 1 and 2 show a conventional position detection device for a mobile robot. More particularly, FIG. 1 is a diagram showing the construction and operational principle of the position detection device, and FIG. 2 is a diagram showing the position detection device when interfering rays of light are applied to the position detection device.

Referring to FIG. 1, the conventional position detection device includes a light-emitting element 2 for emitting infrared light in a straight line, a light reception element 5 on which infrared light reflected from an obstacle is focused, and a signal processing unit 8 for measuring the distance between the position of the light, focused on the light reception element, and the obstacle.

The light-emitting element 2 includes an infrared light-emitting diode (IR-LED) 3 for emitting infrared light, and a light transmission lens 4 for condensing the infrared light output from the IR-LED 3 so that the infrared light goes straight ahead.

The light reception element 5 includes a light reception lens 7 for condensing the infrared light reflected from the obstacle, and a position-sensitive detector 6 on which the infrared light condensed by the light reception lens 7 is focused.

The light reception element 5 condenses the infrared light at a different angle depending on the distance from an obstacle from which the infrared light is reflected. Accordingly, infrared light is focused on the upper part of the position-sensitive detector when the distance from an obstacle is small, i.e., for an obstacle 11a near to the position detection device. On the other hand, the infrared light is focused on the lower part of the position-sensitive detector when the distance from the obstacle is large, i.e., for another obstacle 11b far from the position detection device.

The signal processing unit is configured to measure a distance between the position of the position-sensitive detector, on which infrared light is focused, and an obstacle from which the infrared light is reflected.

However, in the conventional position detection device, external interfering rays of light, such as natural light or illumination, other than infrared light emitted from a light source 12a are directly incident on the position-sensitive detector 6, as shown in FIG. 2, so the external interfering rays of light are erroneously determined to be the infrared light reflected from an obstacle 12b. Accordingly, there is a problem in that the obstacle 12b is erroneously determined to exist although the obstacle does not exist.

SUMMARY OF THE INVENTION

Accordingly, the present invention has been made in view of the above problems, and it is an object of the present invention to provide a position detection device for a mobile robot and a robot cleaner including the same, which is capable of detecting a distance between the position detection device and an obstacle, while the robot cleaner moves, without erroneously recognizing external rays of light as obstacles.

According to an aspect of the present invention, there is provided a position detection device for a mobile robot, including a light-emitting element for emitting light, a light reception element on which light transferred from a bottom, of the light emitted from the light-emitting element and then reflected from an obstacle, is focused, and a signal processing unit for calculating a distance between a position where the light incident on the light reception element is focused and the obstacle.

According to the position detection device for a mobile robot and the robot cleaner including the same in accordance with the present invention, external interfering rays of light are not determined to be obstacles. Accordingly, the present invention is advantageous in that the mobile robot and the robot cleaner can operate normally although external interfering rays of light are present.

Further, according to the position detection device for a mobile robot and the robot cleaner including the same in accordance with the present invention include an incorrect signal processing unit or a plurality of the position detection devices. Accordingly, the present invention is advantageous in that it can prevent the distance from an obstacle from being erroneously calculated because light emitted obliquely is reflected from an obstacle, such as the bottom of a movement space.

BRIEF DESCRIPTION OF THE DRAWINGS

The above and other objects, features and other advantages of the present invention will be more clearly understood from the following detailed description taken in conjunction with the accompanying drawings, in which:

FIGS. 1 and 2 show a conventional position detection device for a mobile robot. More particularly.

FIGS. 3 to 7 show a position detection device for a mobile robot according to an embodiment of the present invention. More particularly.

DETAILED DESCRIPTION OF THE EMBODIMENTS

Some embodiments of the present invention will be described in detail with reference to the accompanying drawings.

Figure 3:
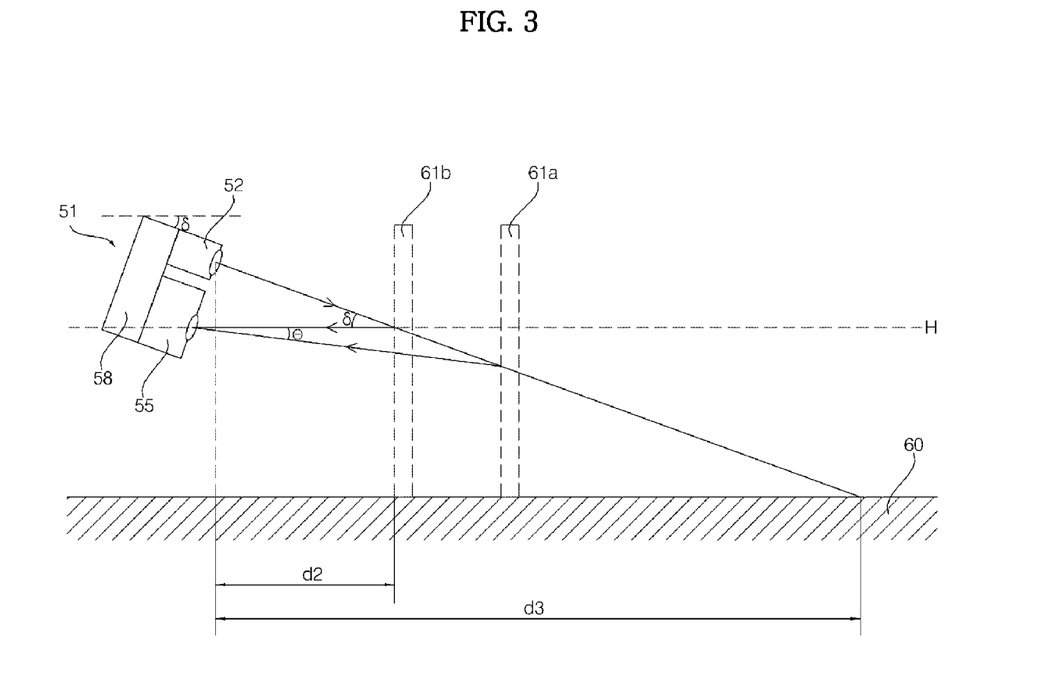
FIG. 3 is a diagram showing the construction of the position detection device.
Figure 4:
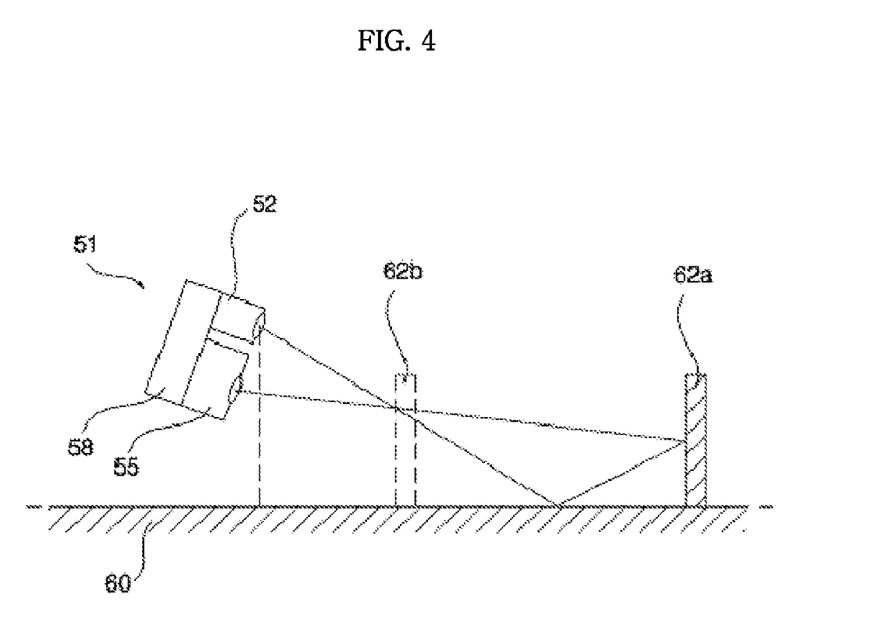
FIG. 4 is a diagram showing an incorrect signal generated by the position detection device.
Figure 5:
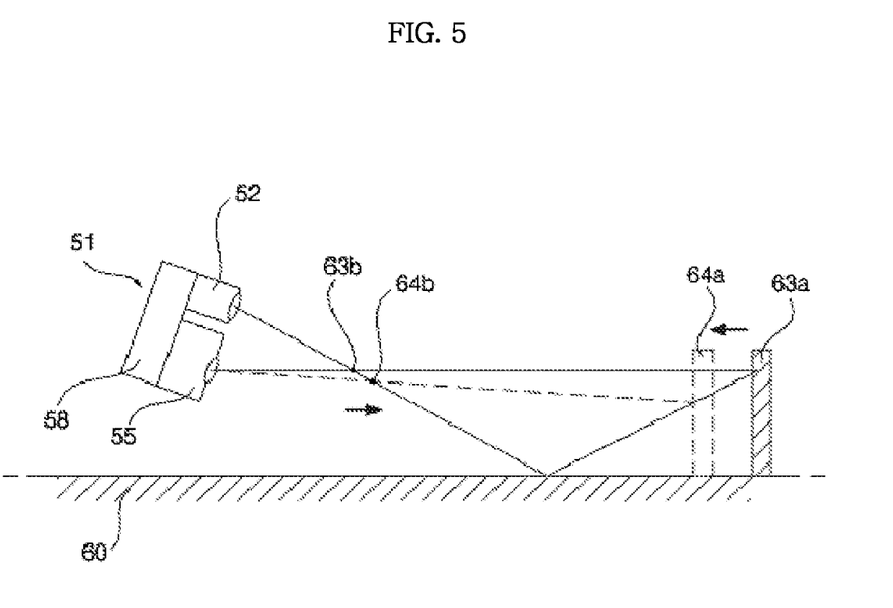
FIG. 5 is a diagram showing a change in an incorrect signal generated by the position detection device.
Figure 6:
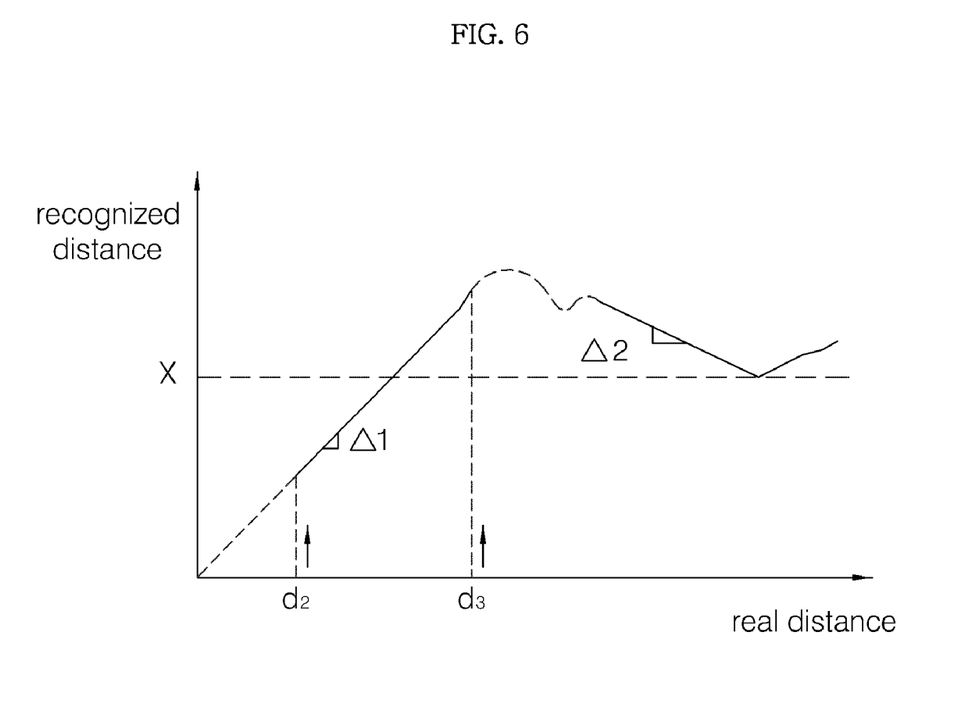
FIG. 6 is a graph showing a relationship between a distance sensed by the position detection device and a real distance.
Figure 7:
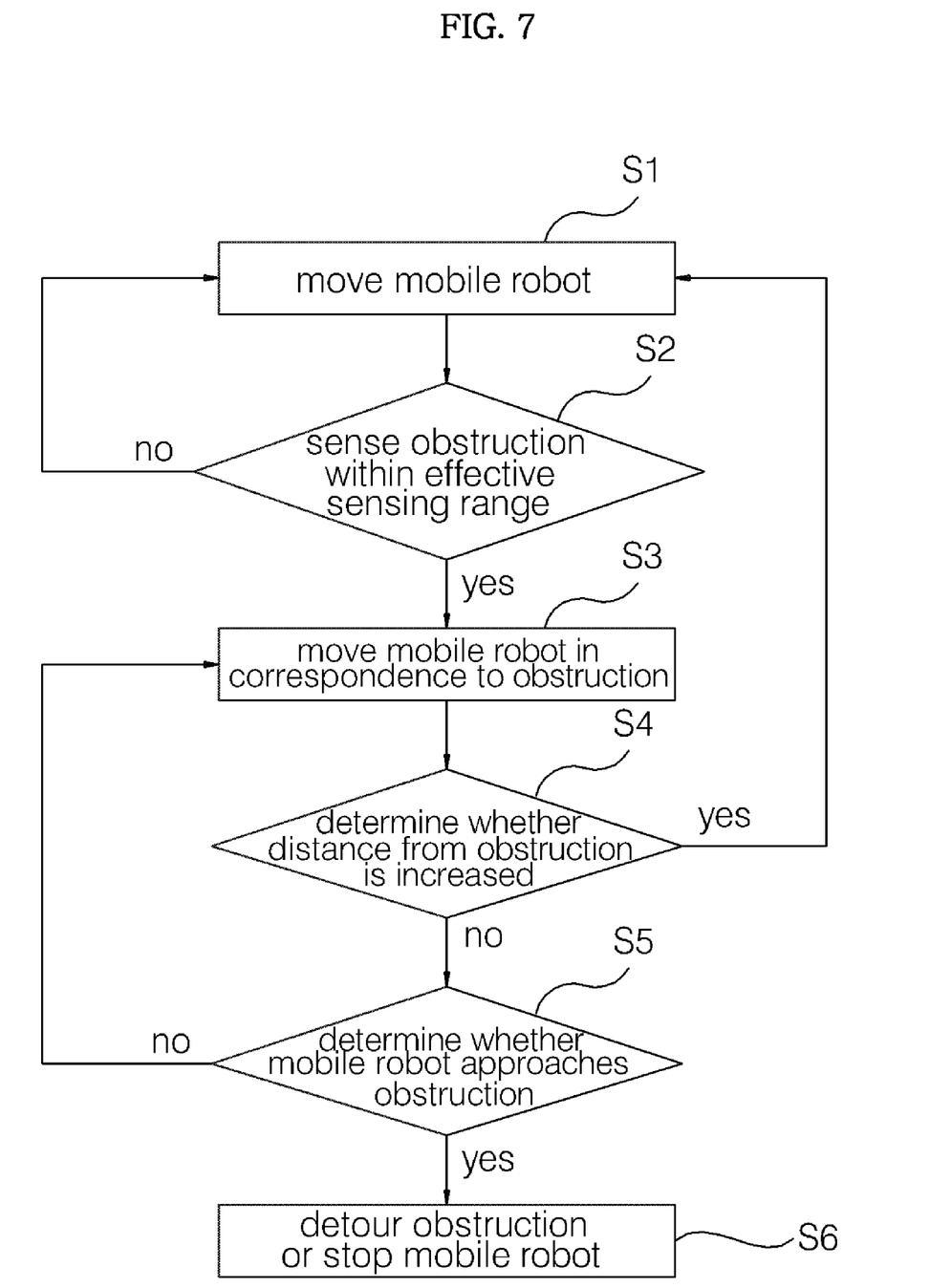
FIG. 7 is a flowchart illustrating an algorithm performed by an incorrect signal processing unit.

FIGS. 3 to 7 show a position detection device for a mobile robot according to an embodiment of the present invention. More particularly, FIG. 3 is a diagram showing the construction of the position detection device, FIG. 4 is a diagram showing an incorrect signal generated by the position detection device, FIG. 5 is a diagram showing a change in an incorrect signal generated by the position detection device 51, FIG. 6 is a graph showing a relationship between a distance sensed by the position detection device and a real distance, and FIG. 7 is a flowchart illustrating an algorithm performed by an incorrect signal processing unit.

As shown in FIG. 3, a position detection device 51 for a mobile robot according to an embodiment of the present invention includes a light-emitting element 52 for emitting light, a light reception element 55 on which light reflected off a bottom 60, of light emitted from the light-emitting element 52 and then reflected from an obstacle, is focused, a signal processing unit 58 for calculating a distance between a position where the light incident on the light reception element 55 is focused and the obstacle, and an incorrect signal processing unit (not shown) for determining light, reflected from a bottom not obstacles, by considering a change while the mobile robot travels within the calculated distance.

The light-emitting element 52 may include an IR-LED for emitting infrared light, and a light transmission lens for condensing the infrared light from the IR-LED so that the infrared light goes straight ahead.

The light reception element 55 may include a light reception lens for condensing the infrared light reflected by obstacles, and a position-sensitive detector on which the infrared light condensed by the light reception lens is focused.

The light reception element 55 is configured to focus thereon light reflected off a bottom 60, of light emitted from the light-emitting element 52 and then reflected from an obstacle. The light reception element 55 may be preferably oriented towards the bottom 60 so that external interfering rays of light are not focused on the light reception element 55. Further, since the light reception element 55 is generally parallel to the light-emitting element 52, the position detection device 51 may be preferably tilted toward the bottom 60 at an angle ($\delta$).

The light reception lens condenses infrared light at as different angle depending on a distance from an obstacle from which the infrared light is reflected. As a result, infrared light is focused on the upper part of the position-sensitive detector of the light reception lens when the distance from the obstacle from which the infrared light is reflected is small. Meanwhile, infrared light is focused on the lower part of the position-sensitive detector of the light reception lens when the distance from the obstacle from which the infrared light is reflected is large.

The position-sensitive detector may consist of a semiconductor device including two output terminals having varying output balances depending on a position where light is focused.

Each of the light-emitting element 52 and the light reception element 55 may be implemented in various ways, for example, using an infrared distance measurement sensor or an infrared temperature measurement sensor other than a position-sensitive element using infrared rays.

The signal processing unit 58 may consist of an operation circuit for receiving the output balance of the position-sensitive detector, calculating a distance from the obstacle based on the output balance, and outputting the calculated distance in the form of a signal.

The position detection device 51 may have a varying effective detection range d2 to d3 depending on whether infrared light transferred from the bottom 60, of infrared light emitted from the light-emitting element 52 and then reflected from an obstacle, can be focused on the light reception element 55.

The effective detection range d2 to d3 is limited to a range between an effective minimum distance d2 and an effective maximum distance d3. The effective minimum distance d2 may refer to a minimum distance where infrared light emitted from the light-emitting element 52 and then reflected from an obstacle 61$b$ is focused on the light reception element 55 in a horizontal direction (H) to the bottom 60. The effective minimum distance d2 may be determined depending on the angle ($\delta$) at which the position detection device 51 is oriented towards the bottom 60.

The effective maximum distance d3 may refer to a distance where infrared light emitted from the light-emitting element 52 is reflected from the bottom 60. In the case in which an obstacle 16$a$ exists within the effective detection range d2 to d3, infrared light emitted from the light-emitting element 52 and then reflected from the obstacle 61$a$ is focused on the light reception element 55 at a specific angle ($\theta$) from the bottom 60.

A mobile robot including the position detection device 51 having the above construction may include a casing forming the external appearance of a main body, a traveling unit for supporting the main body against the bottom of a movement space and moving the main body, an obstacle detection unit mounted in the outer part of the main body and configured to include the position detection device 51 and to detect obstacles within the movement space, and an information processing unit for exchanging signals with the traveling unit and the obstacle detection unit, controlling the traveling unit and the obstacle detection unit, and inputting, outputting, processing, and storing signals.

The traveling unit may include two main wheels rotatably mounted on the lower part of the main body and placed on the right and left sides of the main body, two wheel motors coupled to the respective main wheels and configured to rotate the respective main wheels clockwise or counterclockwise, and a caster configured to support the main body and placed on the lower part of the main body so that the caster rotates in a direction where the robot travels.

The obstacle detection unit may include a plurality of the position detection devices 51, and a plurality of ultrasonic sensors, light sensors, or impact sensors for determining the distance from obstacles or determining whether obstacles exist using the reflection of sound waves or electromagnetic waves or impacts caused by the movement of the mobile robot.

The information processing unit may include a microcomputer. The microcomputer includes an input/output unit for transmitting/receiving signals to/from the outside, memory for storing received/transmitted or processed signals or other information, a microprocessor for processing signals or other information and controlling the operations of the input/output unit and the memory, and an interface circuit coupled to the input/output unit, the memory, and the microprocessor and configured to mediate the transfer of signals between the above elements.

The incorrect signal processing unit transmits/receives signals to/from the information processing unit. The incorrect signal processing unit is configured to perform an algorithm (refer to FIG. 7) for determining whether obstacles exist within a distance calculated by the signal processing unit 58 by considering a change occurring while the mobile robot travels within the calculated distance.

It is to be understood that the incorrect signal processing unit is not limited to an additional unit for exchanging signals with the information processing unit. For example, the incorrect signal processing unit may be embedded in the information processing unit in order to commonly use the components of the information processing unit, and the algorithm (refer to FIG. 7) may be stored in the memory and may be performed by the microprocessor.

The algorithm may include, as shown in FIG. 7, driving the mobile robot at step S1, determining whether an obstacle within an effective detection range has been detected by the position detection device 51, driving the mobile robot in response to the obstacle at step S3, determining whether the distance from the obstacle increases at step S4, determining whether the mobile robot has approached the obstacle at step S5, and detouring the obstacle or stopping the operation of the mobile robot when the mobile robot is close to the obstacle at step S6.

At step S1, the step S2 is frequently called while the mobile robot travels.

At step S2, the position detection device 51 determines whether an obstacle exists within the effective detection range based on a signal input to the microcomputer. If, as a result of the determination, the obstacle exists within the effective detection range, the process proceeds to the step S3. However, if, as a result of the determination, an obstacle does not exist within the effective detection range, the process returns to the step S1.

At step S3, a signal is transmitted to the microcomputer such that the mobile robot performs a necessary operation, for example, the mobile robot slowly decelerates, and the process then proceeds to the step S4.

At step S4, the position detection device 51 determines whether the distance from the obstacle increases due to the movement at step S3 based on a signal input to the microcomputer. If, as a result of the determination, the distance from the obstacle increases, the process returns to the step S2. However, if, as a result of the determination, the distance from the obstacle does not increase, the process proceeds to the step S5.

At step S5, it is determined whether the mobile robot has approached the obstacle to the extent that the mobile robot collides with the obstacle. If, as a result of the determination, the mobile robot has approached the obstacle to the extent that the mobile robot collides with the obstacle, the process proceeds to the step S6. However, if, as a result of the determination, the mobile robot has not approached the obstacle, the process returns to the step S3.

At step S6, a signal is transmitted to the microcomputer so that the operation of the mobile robot is stopped or the mobile robot detours the obstacle.

The operation of the position detection device for a mobile robot having the above construction according to an embodiment of the present invention is described below.

Referring to FIG. 3, the light-emitting element 52 emits infrared light using the IR-LED. The light transmission lens makes the emitted infrared light go straight ahead toward a movement space. The infrared light is reflected from the obstacle 61a and then focused on the position-sensitive detector of the light reception element 55. An output balance of the position-sensitive detector changes depending on a position where the reflected infrared light is focused. The signal processing unit 58 converts the output balance into a distance from the obstacle and transmits the calculated distance to the microcomputer.

Meanwhile, the infrared light emitted from the light-emitting element 52 may be first reflected from the bottom 60 of the movement space, reflected from the obstacle 62a and then incident on the light reception element 55, as shown in FIG. 4. In this case, the position detection device 51 erroneously determines that an obstacle 62b exists at a point where a path along which the infrared light is emitted meets a path along which the infrared light is reflected. The position detection device 51 transmits the distance from the between the erroneous obstacle 62b and the position detection device 51 to the microcomputer in the form of a signal.

In the case in which infrared light is reflected from the bottom 60 of a movement space, reflected from an obstacle 63a again, and then incident on the light reception element 55 as shown in FIG. 5, the position detection device 51 determines that the distance between the obstacle 63a and the position detection device 51 becomes distant, although the mobile robot moves toward the obstacle.

In other words, a real distance from the obstacle is identical or proportional ($\Delta 1 > 0$) to a recognized distance detected by the position detection device within the effective detection range d2 to d3 as shown in FIG. 6. However, in the case in which the obstacle is located outside the effective detection range, a real distance from the obstacle is inversely proportional ($\Delta 2 < 0$) to the recognized distance detected by the position detection device. Experiments showed that this phenomenon occurs when a recognized distance is a specific value (x) or more.

As described above, the incorrect signal processing unit performs the algorithm (refer to FIG. 7) using the inverse proportion relation ($\Delta 2 < 0$) between a real distance and a recognized distance in order to determine whether an obstacle actually exists within a distance from the obstacle detected by the position detection device.

Referring to FIG. 7, the flow of the algorithm may be divided depending on whether an obstacle exists within the effective detection range or approaches from the outside of the effective detection range.

In the case in which the obstacle exists within the effective detection range, for example, when the obstacle exists in a direction to which the mobile robot is turned while moving, the position detection device 51 repeatedly performs the steps S3, S4, and S5 in order to approach the obstacle and then detour the obstacle.

In the case in which the obstacle approaches from the outside of the effective detection range, the position detection device 51 performs the steps S2, S3, and S4 whenever the step S2 is called, until the obstacle enters the effective detection range. If the obstacle enters the effective detection range, the position detection device 51 repeatedly performs the steps S3, S4, and S5 in order to approach the obstacle and then detour the obstacle.

Figure 8:
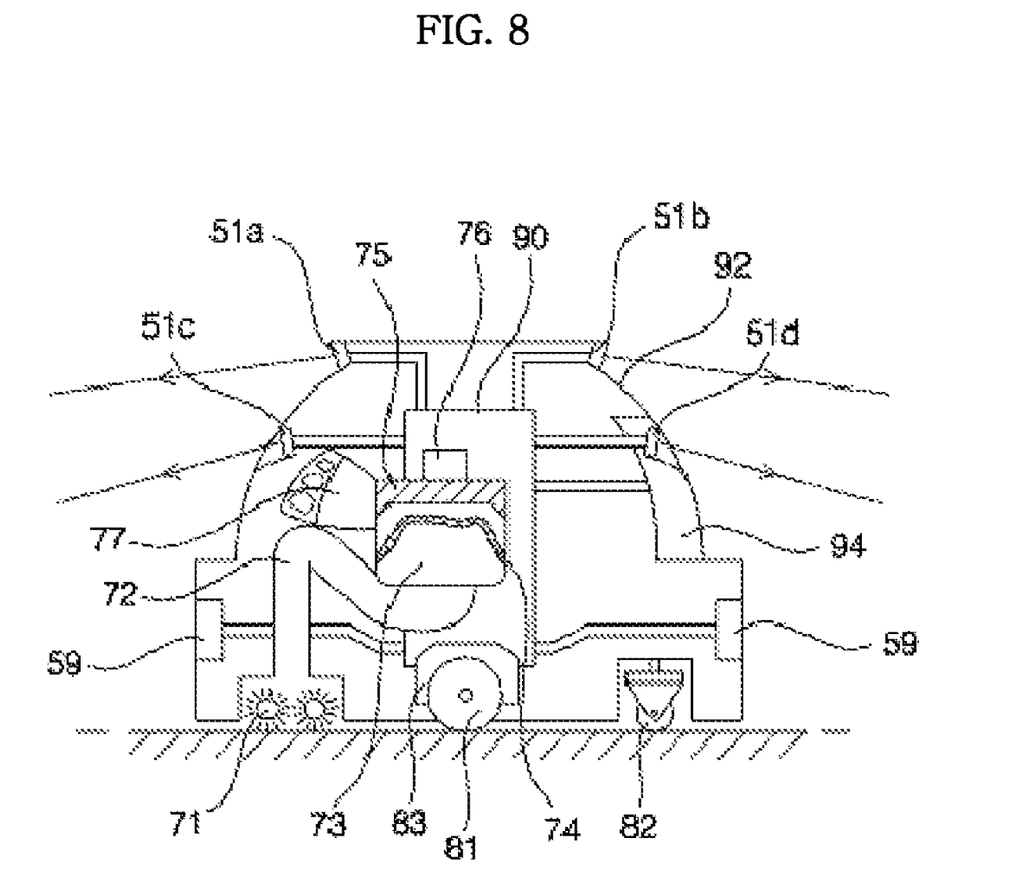
FIG. 8 is a diagram showing the construction of a robot cleaner according to an embodiment of the present invention.

FIG. 8 is a diagram showing the construction of a robot cleaner according to an embodiment of the present invention.

As shown in FIG. 8, the robot cleaner according to an embodiment of the present invention includes a casing 92 forming the outer part of a main body, a cleaning unit mounted in the main body and configured to clean a cleaning space, a traveling unit for supporting the main body against the bottom of the cleaning space and moving the main body, eight position detection devices 51a, 51b, 51c, and 51d placed near the outer part of the main body and configured to emit light, detect a distance from an obstacle from which the light is reflected, and focus thereon light transferred from the bottom in order to distinguish the light from external interfering rays of light, and an information processing unit 90 for exchanging signals with the position detection devices and controlling the traveling unit so that the robot cleaner cleans the cleaning space while moving within the cleaning space of itself.

The eight position detection devices 51a, 51b, 51c, and 51d are mounted in pairs on the front, rear, right, and left sides of the robot cleaner in the upper and lower sides. The position detection devices 51a and 51b on the upper side are mounted in the robot cleaner so that they have the same height from the bottom of the cleaning space and have the same emission angle for the bottom of the cleaning space. The position detection devices 51c and 51d on the lower side are also mounted in the robot cleaner so that they have the same height from the bottom of the cleaning space and have the same emission angle for the bottom of the cleaning space. However, the emission angle of each of the position detection devices 51a and 51b on the upper side differs from that of each of the position detection devices 51c and 51d on the lower side. For example, the emission angle of each of the position detection devices 51a and 51b on the upper side may be 10 degrees, and the emission angle of each of the position detection devices 51c and 51d on the lower side may be 12 degrees.

The information processing unit 90 may preferably include a microcomputer. The microcomputer includes an input/output unit for exchanging signals with the outside, memory for storing received/transmitted or processed signals or other information, a microprocessor for processing signals or other information and controlling the operations of the input/output unit and the memory, and an interface circuit coupled to the input/output unit, the memory, and the microprocessor and configured to mediate the transfer of signals between the above elements.

The robot cleaner may further include the incorrect signal processing unit configured to perform an algorithm for determining whether obstacles exist within distances detected by the position detection devices, while moving within the distances, by considering a change occurring while moving. The incorrect signal processing unit is embedded in the information processing unit in order to commonly use the components of the information processing unit, and the algorithm is stored in the memory and performed by the microprocessor.

Alternatively, whether obstacles actually exist within distances detected by the position detection devices 51a, 51b, 51c, and 51d may also be performed by determining whether distances from obstacles detected by the position detection devices 51a and 51c are identical using the position detection devices 51a and 51c that emit rays of light in the same direction while changing their heights and emission angles of the position detection devices. If, as a result of the determination, the difference in the distances falls within a permissible error due to the accuracy of the position detection devices 51a and 51c, it is determined that the distances are identical.

Referring to FIG. 8, the robot cleaner may include a flow passage formed in the main body and configured to have an inlet port 72 and an outlet port 77, a fan 75 placed in the flow passage and configured to suction pollutants from a cleaning space, a brush unit 71 placed at the entry of the flow passage and configured to apply physical force to pollutants in order to assist the suctioning operation of the fan 75, a filter 74 placed in the flow passage and configured to filter pollutants in order to prevent the pollutants from being introduced into the fan 75 or the pollutants from being discharged from the flow passage, and a dust bag 73 placed in the flow passage and configured to collect suctioned pollutants.

The traveling unit may include two main wheels 81, two wheel motors 83, and a caster 82. The two main wheels 81 are configured to support and move the main body, rotatably placed on the lower side of the main body, and provided at least on the right and left sides of the main body. The two wheel motors 83 are coupled to the respective wheel motors 83, provided at least on the right and left sides of the main body, and configured to rotate the main wheels 81, which are connected thereto, clockwise or counterclockwise. The caster 82 is configured to support the main body and placed on the lower side of the main body so that the caster can be rotated in all directions.

The wheel motors 83 are configured to operate clockwise or counterclockwise or stop in response to a signal output from the information processing unit 90.

The robot cleaner may further include a manipulation unit 94 for providing a user with an interface regarding the operation of the robot cleaner, and a power supply unit (not shown) for supplying power necessary for the operation of the robot cleaner. The robot cleaner may further include a variety of sensors 59, such as a position sensor for detecting the distance from an obstacle from which light emitted in parallel to the bottom of a cleaning space is reflected, an ultrasonic sensor for detecting the shape of an obstacle or the distance from the obstacle using ultrasonic waves, and a bottom sensor for detecting the tilt of the bottom of the cleaning space.

The operation of the robot cleaner having the above construction according to an embodiment of the present invention is described below.

The incorrect signal processing unit embedded in the microcomputer determines whether distances from obstacles detected by the position detection devices 51a, 51b, 51c, and 51d increase or decrease while the robot cleaner operates and determines whether obstacles actually exist within the detected distances based on the determination result.

Further, the microcomputer determines whether distances from obstacles detected by the position detection devices 51a and 51c, which emit light in the same direction, are identical while changing the heights and emission angles of the position detection devices and determines whether obstacles actually exist within the detected distances based on the determination result.

As described above, whether obstacles exist within distances detected by the position detection devices 51a and 51c is determined based on the above two determinations. Accordingly, the distance from an obstacle can be determined more accurately.

According to the position detection device for a mobile robot and the robot cleaner including the same in accordance with the present invention, external interfering rays of light are not recognized as obstacles. Accordingly, the present invention is advantageous in that the mobile robot and the robot cleaner can operate normally although external interfering rays of light are present.

Further, according to the position detection device for a mobile robot and the robot cleaner including the same in accordance with the present invention include the incorrect signal processing unit or the plurality of position detection devices. Accordingly, the present invention is advantageous in that it can prevent the distance from an obstacle from being erroneously calculated because light emitted obliquely is reflected off an obstacle, such as the bottom of a movement space.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A position detection device for a mobile robot, comprising:
    a light-emitting element for emitting light toward a bottom;
    a light reception element on which light transferred from the bottom, of the light emitted from the light-emitting element and then reflected from an obstacle, is focused; and
    a signal processing unit for calculating a distance between the light-emitting element and the obstacle.

2. The position detection device of claim 1, further comprising an incorrect signal processing unit for determining the light reflected from the bottom by considering a change occurring while the mobile robot moves within the calculated distance.

3. The position detection device of claim 1, wherein the light-emitting element comprises:
    an infrared light-emitting diode for emitting infrared light; and
    a light transmission lens for condensing the infrared light emitted from the infrared light-emitting diode so that the infrared light goes straight ahead.

4. The position detection device of claim 1, wherein the light reception element comprises:
    a light reception lens for condensing the light reflected from the obstacle; and
    a position-sensitive detector on which the light condensed by the light reception lens is focused.

5. The position detection device of claim 4, wherein the light reception lens is oriented toward the bottom.

6. A robot cleaner, comprising:
    position detection devices for emitting light toward a bottom and detecting distances between the position detection devices and an obstacle from which the light is reflected, and
    an information processing unit for transmitting or receiving signals to or from the position detection devices and controlling a traveling unit so that the robot cleaner cleans a cleaning space of itself while the robot cleaner moves within the cleaning space.

7. The robot cleaner of claim 6, further comprising:
    a casing forming an external portion of a main body;
    a cleaning unit placed in the main body and configured to clean the cleaning space; and
    a traveling unit for supporting the main body against a bottom of the cleaning space and move the main body.

8. The robot cleaner of claim 7, wherein each of the position detection devices further comprises an incorrect signal processing unit for determining the light reflected from the bottom by considering a change occurring while the robot cleaner moves within the detected distance.

9. The robot cleaner of claim 6, wherein each of the position detection devices comprises:
    a light-emitting element for emitting light toward a bottom;
    a light reception element on which light transferred from the bottom, of the light emitted from the light-emitting element and then reflected from an obstacle, is focused; and
    a signal processing unit for calculating a distance between the light-emitting element and the obstacle.

10. The robot cleaner of claim 9, wherein the light-emitting element comprises:
    an infrared light-emitting diode for emitting infrared light; and
    a light transmission lens for condensing the infrared light emitted from the infrared light-emitting diode so that the infrared light goes straight ahead.

11. The robot cleaner of claim 9, wherein the light reception element comprises:
    a light reception lens for condensing the light reflected from the obstacle; and
    a position-sensitive detector on which the light condensed by the light reception lens is focused.

12. The robot cleaner of claim 11, wherein the light reception lens is oriented toward the bottom.

13. A position detection method using a mobile robot, comprising:
    a light-emitting element emitting light toward a bottom;
    a light reception element receiving light transferred from the bottom, of the light emitted from the light-emitting element and then reflected from an obstacle;
    a signal processing unit calculating a distance between the light-emitting element and the obstacle;
    an incorrect signal processing unit determining whether the distance between the robot cleaner and the obstacle increases; and
    an incorrect signal processing unit determining whether the robot cleaner has approached the obstacle.

14. A position detection method using a mobile robot which comprises:
    emitting light from a light-emitting element toward a bottom location;
    receiving light by a light-receiving element from the bottom location and reflected from an obstacle;
    calculating a distance between the light-emitting element and the obstacle by a signal processing unit;
    determining whether or not the distance between a robot cleaner and the obstacle changes; and
    determining whether or not the robot cleaner has approached the obstacle.

15. The method of claim 14, wherein as a result of determining whether or not the distance between the robot cleaner and the obstacle changes, the method returns to and repeats the light-emitting and light-receiving detection method.

* * * * *